(12) United States Patent
Goyal et al.

(10) Patent No.: US 8,938,266 B1
(45) Date of Patent: Jan. 20, 2015

(54) METHOD AND SYSTEM FOR BASE STATION REPEAT PAGING

(75) Inventors: Anoop K. Goyal, Overland Park, KS (US); Jasinder P. Singh, Olathe, KS (US); Maulik K. Shah, Overland Park, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 320 days.

(21) Appl. No.: 13/592,984

(22) Filed: Aug. 23, 2012

(51) Int. Cl.
*H04W 68/00* (2009.01)
*H04B 7/00* (2006.01)

(52) U.S. Cl.
USPC .......................................... 455/458; 455/515

(58) Field of Classification Search
CPC .................................................... H04W 68/00
USPC ............................................................ 455/458
See application file for complete search history.

(56) References Cited

U.S. PATENT DOCUMENTS

| | | | |
|---|---|---|---|
| 5,826,173 A | 10/1998 | Dent | |
| 5,862,484 A | 1/1999 | Lee | |
| 5,918,174 A | 6/1999 | Chennakeshu et al. | |
| 5,924,042 A | 7/1999 | Sakamoto et al. | |
| 5,940,431 A | 8/1999 | Haartsen et al. | |
| 6,678,258 B1 | 1/2004 | Capurka et al. | |
| 6,823,173 B2 | 11/2004 | Srey et al. | |
| 7,898,983 B2 | 3/2011 | Laroia et al. | |
| 7,983,696 B1 | 7/2011 | Manghat et al. | |
| 2003/0003912 A1 | 1/2003 | Melpignano et al. | |
| 2003/0152049 A1 | 8/2003 | Turner | |
| 2005/0153714 A1* | 7/2005 | Subrahmanya | 455/458 |
| 2005/0186973 A1 | 8/2005 | Gaal et al. | |
| 2005/0215272 A1 | 9/2005 | Helferich | |
| 2008/0248817 A1 | 10/2008 | Gao et al. | |
| 2008/0293437 A1* | 11/2008 | Ranganathan et al. | 455/458 |
| 2009/0017845 A1 | 1/2009 | Wu et al. | |
| 2010/0022256 A1* | 1/2010 | Hochedez | 455/458 |

FOREIGN PATENT DOCUMENTS

WO WO01/10146 8/2001
WO 0180588 A1 10/2001

OTHER PUBLICATIONS

Office Action for U.S. Appl. No. 12/420,413 Mailed Jan. 30, 2012.
Office Action for U.S. Appl. No. 12/420,413 Mailed Aug. 3, 2011.

* cited by examiner

*Primary Examiner* — Huy C Ho

(57) ABSTRACT

Disclosed are a method, apparatus, and system for managing repeat-paging processes within a radio access network. When a base station receives a paging directive, the base station begins broadcasting a first series of page messages destined to a mobile station. Response to the first base station receiving no response from the mobile station to the first series of page messages, the first base station sends a repeat-paging directive to a second base station. The repeat-paging directive directs the second base station to begin broadcasting a second series of page messages destined to the mobile station.

20 Claims, 4 Drawing Sheets

METHOD AND SYSTEM FOR BASE STATION REPEAT PAGING

BACKGROUND

In a typical cellular radio access network (RAN), an area is divided geographically into a number of coverage areas or regions (namely, cells and cell sectors). The coverage areas are defined by radio frequency (RF) radiation patterns from base stations (for example, eNodeBs and base transceiver stations (BTSs)). The base stations in a region may be communicatively linked with a control node that manages certain operations of the base stations and that may functions generally as an aggregation point for communications passing through the base stations. The control node may also provide or facilitate connectivity and/or communication with a transport network such as the public switched telephone network (PSTN) or the Internet. Generally, the control node may include one or more components communicatively linked to each other, for example, mobility management entities (MMEs), serving gateways (S-GWs), packet gateways (P-GWs), RAN controllers, mobile switching centers (MSCs), and packet data serving nodes (PDSNs). Other examples are possible as well.

When a mobile station (such as a cellular telephone, pager, or appropriately equipped portable computer, for instance) is positioned in a coverage area of such a network, the mobile station communicates via an RF air interface with base station antennas that radiate to define the coverage area. Consequently, a communication path may be established between the mobile station and the transport network, via the air interface, the base station, and the control node.

In practice, communications over the air interface between a base station and a mobile station will comply with a defined air interface protocol or access technology. Numerous such protocols are well known in the art, and others will be developed in the future. Examples of existing protocols include CDMA (e.g., 1xRTT, 1xEV-DO), LTE, WiMax, iDEN, TDMA, AMPS, GSM, GPRS, UMTS, EDGE, microwave, satellite, MMDS, Wi-Fi, and Bluetooth.

In general, when the control node encounters a trigger event that indicates a need to transmit information to a given mobile station, the control node may cause one or more base stations to page the mobile station. For instance, the control node may initiate paging in the coverage area where the mobile station was last registered and in one or more coverage areas surrounding that coverage area, out to a particular radius that defines a paging area. If the mobile station responds to the page, then the control node would thereby identify the coverage area in which the mobile station is currently operating, and the control node may arrange for transmission of the information to the mobile station in that coverage area.

In each wireless coverage area, the air interface defined by the serving base station may be divided into various discrete channels by applying one or more mechanisms, such as unique spread-spectrum coding, time division multiplexing, and/or frequency differentiation, for instance. One or more of the channels in each coverage area may be reserved for use as a paging channel, on which the base station may broadcast page messages destined to particular mobile stations. And one or more of the channels in each coverage area may be reserved for use as an access channel, on which mobile stations may transmit page response messages to the base station. In practice, when a base station receives from a control node a directive to page a mobile station, the base station may thus responsively broadcast on the paging channel a page message directed to that mobile station. If and when the mobile station receives the page message, the mobile station may then programmatically transmit a page response message to the base station on the access channel.

OVERVIEW

In some scenarios, when a control node detects a paging trigger for paging a mobile station, the control node responsively directs a first base station (or a plurality of first base stations) to begin wirelessly broadcasting an initial or first series of page messages destined to the mobile station. If the base station or control node receives a response from the mobile station to the first series of page messages, the first base station can discontinue broadcasting the page messages, and a communication path can be established between the mobile station and the transport network. However, if the base station or control node does not receive a response from the mobile station within a defined period, the control node may direct a second base station (or some other set of base stations—possibly covering a larger area) to broadcast a second series of repeat-page messages to page the mobile station. The control node may repeat this process a defined number of times, perhaps while systematically expanding the paging area, before the control node concludes that the mobile station could not be found and declares the paging effort to have failed.

If the control node were to process both new paging requests and repeat-paging requests, the resulting backhaul traffic between the control node and each base station to which the control node sends paging directives could be excessive. To avoid overwhelming the backhaul channels with such traffic, in the present disclosure, the repeat-page message transmission by the second base station can be triggered by a repeat-paging directive sent from the first base station to the second base station without routing the repeat-paging directive through the control node. In one example, the repeat-paging directive is sent from the first base station to the second base station, which the first base station selects from a neighbor list managed by the first base station. The neighbor list includes information relating to one or more other base stations that are arranged to radiate to define one or more coverage areas neighboring a coverage area defined by the first base station. This neighbor list can be automatically or periodically updated based on dynamic conditions of the RAN. Thus, the neighbor list can be used to intelligently increase the paging area in accordance with changing network conditions.

By having the first base station send the repeat-paging directive to the second base station, the repeat-paging function may advantageously be handled by the base stations without burdening the control node. This arrangement may thus allow the control node to process more new paging requests per second, as compared to arrangements where the control node processes both new paging requests and repeat-paging requests. This arrangement may also reduce capital expenses associated with maintaining additional control node capacity and backhaul capacity to support processing of both new paging requests and repeat-paging requests.

These as well as other aspects, advantages, and alternatives will become apparent to those of ordinary skill in the art by reading the following detailed description, with reference where appropriate to the accompanying drawings. Further, it should be understood that the disclosure provided by this overview and the other description throughout this document

DETAILED DESCRIPTION

Figure 1:
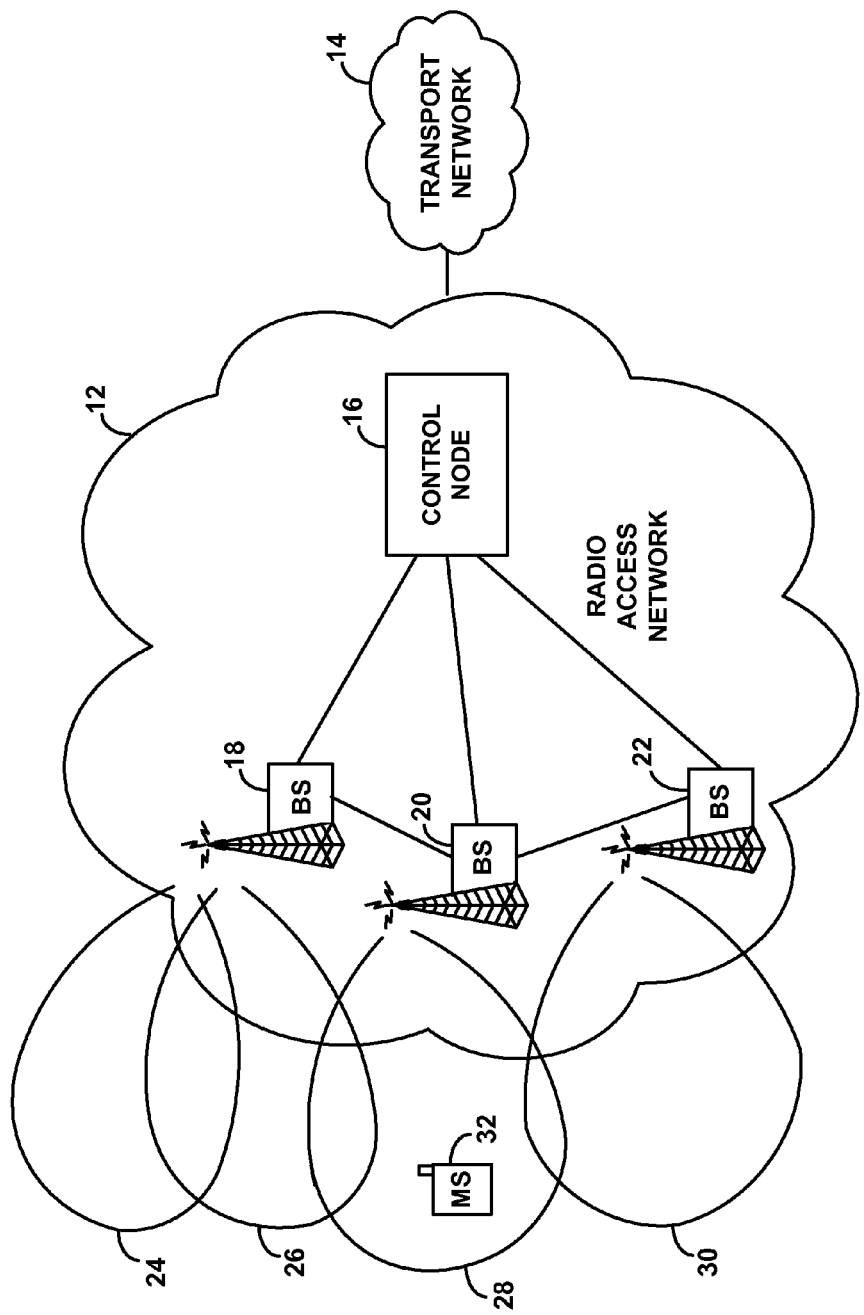
FIG. 1 is a block diagram of a cellular wireless communication system according to one embodiment of the present disclosure.

Referring to the drawings, FIG. 1 illustrates a cellular wireless communication system that includes a RAN 12, which functions to provide mobile stations with cellular wireless communication service, such as connectivity with a transport network 14 for instance. In general, the RAN includes a control node 16 and multiple base stations, three examples of which 18, 20, 22 are shown in FIG. 1.

Each base station preferably includes transceiver equipment and antennas (e.g., on an antenna tower) arranged to define one or more cellular wireless coverage areas such as a cell and cell sectors. For instance, base station 18 is shown radiating to define representative coverage areas 24, 26, base station 20 is shown radiating to define a representative coverage area 28, and base station 22 is shown radiating to define a representative coverage area 30. Shown operating within coverage area 28 is then a representative mobile station 32, which can be any type of wireless communication device capable of engaging in air interface communication with the base station.

The air interface of each coverage area may define various channels, including but not limited to at least one paging channel through which the base station can broadcast page messages destined for receipt by target mobile stations and at least one access channel through which mobile stations can send page response messages to the base stations. These channels may be defined in accordance with an agreed air interface communication protocol, such as one of those noted above for instance, and both the base station and the mobile station should be arranged to communicate in accordance with the agreed protocol. By way of example and without limitation, the channels may be defined in accordance with an LTE protocol.

In the present example, the control node 16 functions to manage certain aspects of the RAN operation, such as certain base station functions and features of air interface communication. As noted above, the control node can take various forms. For instance, the control node can be an MME that controls communications between mobile stations, the eNodeBs, and other components of the network.

Figure 2:
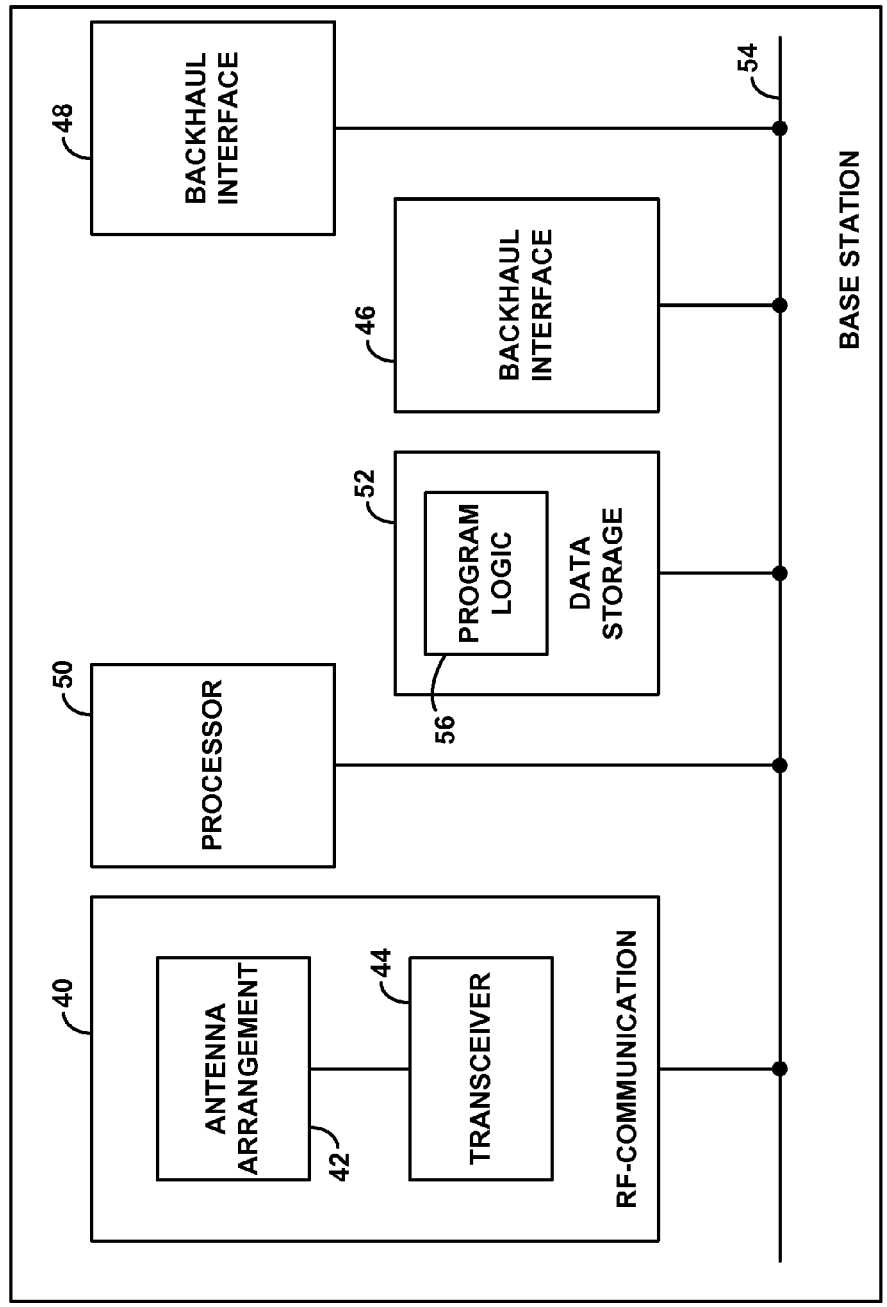
FIG. 2 is a block diagram of an example base station operable within the system of FIG. 1.

FIG. 2 is a block diagram of a base station, showing some of the functional components that each base station may include in the arrangement of FIG. 1. As shown, the base station includes for each of its one or more coverage areas an RF communication block 40 that includes a respective antenna arrangement 42 and transceiver 44, a first backhaul interface 46, a second backhaul interface 48, a processor 50, and non-transitory data storage 52, all of which may be communicatively linked together by a system bus, network, or other connection mechanism 54.

The antenna arrangement 42 may include one or more antennas arranged in a manner now known or later developed for radiating to define a wireless coverage area. Typically, the antenna arrangement would be mounted at the top of an antenna tower. But the antenna arrangement can be provided in some other manner or location (such as in a small scale femtocell, for instance. Transceiver 44, in turn, preferably comprises a power amplifier, modem chipset, channel cards, and other circuitry for sending and receiving communications via the antenna arrangement 42 in accordance with the agreed air interface protocol.

The first backhaul interface 46 comprises a mechanism for communicatively linking the base station with the control node 16, such as to facilitate communication of control signaling between the base station and the control node. Thus, the first backhaul interface 46 may provide a first communication link interface between the base station and the control node. The second backhaul interface 48 comprises a mechanism for communicatively linking the base station with other base stations, such as to facilitate communication of control signaling between the base station and other base stations. Thus, the second backhaul interface 48 may provide a second communication link interface between the base station and the one or more other base stations. The first and second communication links can be direct links or may include one or more intermediate nodes. For instances, under the LTE protocol, the control node can be an MME and the base stations can be eNodeBs, such that the first communication link interface can be an S1 link interface and the second communication link interface can be an X2 link interface. In any event, the first and second backhaul interfaces 46, 48 may take whatever form is necessary to couple with the communication links to the control node and to other base stations.

The processor 50 may include one or more general purposes processors (e.g., INTEL microprocessors) and/or one or more special purpose processors (e.g., dedicated digital signal processors or application specific integrated circuits). If the processor comprises multiple processors, the processors may work separately or in combination (e.g. in parallel). Further, the functions of the processor 50 can be integrated in whole or in part with the transceiver 44 or with one or more other aspects of the base stations.

The data storage 52, in turn, may include one or more volatile and/or non-volatile storage components, such as magnetic, optical, or organic storage components, which can be integrated in whole or in part with the processor 50. As shown, the data storage 52 may contain program logic 56, which can be executed by the processor 50 to carry out certain base station functions described herein, for example, the functions described in more detail with reference to FIGS. 4 and 5. For instance, the program logic 56 may be executable to receive paging directives from the control node 16 and repeat-paging directives from other base stations and to responsively begin to broadcast page messages destined to a target mobile station. Further, the program logic may also be executable upon receipt from the mobile station of a response to one of the page messages, to send to the control node a notification of the received response (e.g., the received response itself) and to send a paging-stop directive to other base stations to direct the other base stations to responsively discontinue broadcasting page messages.

Figure 3:
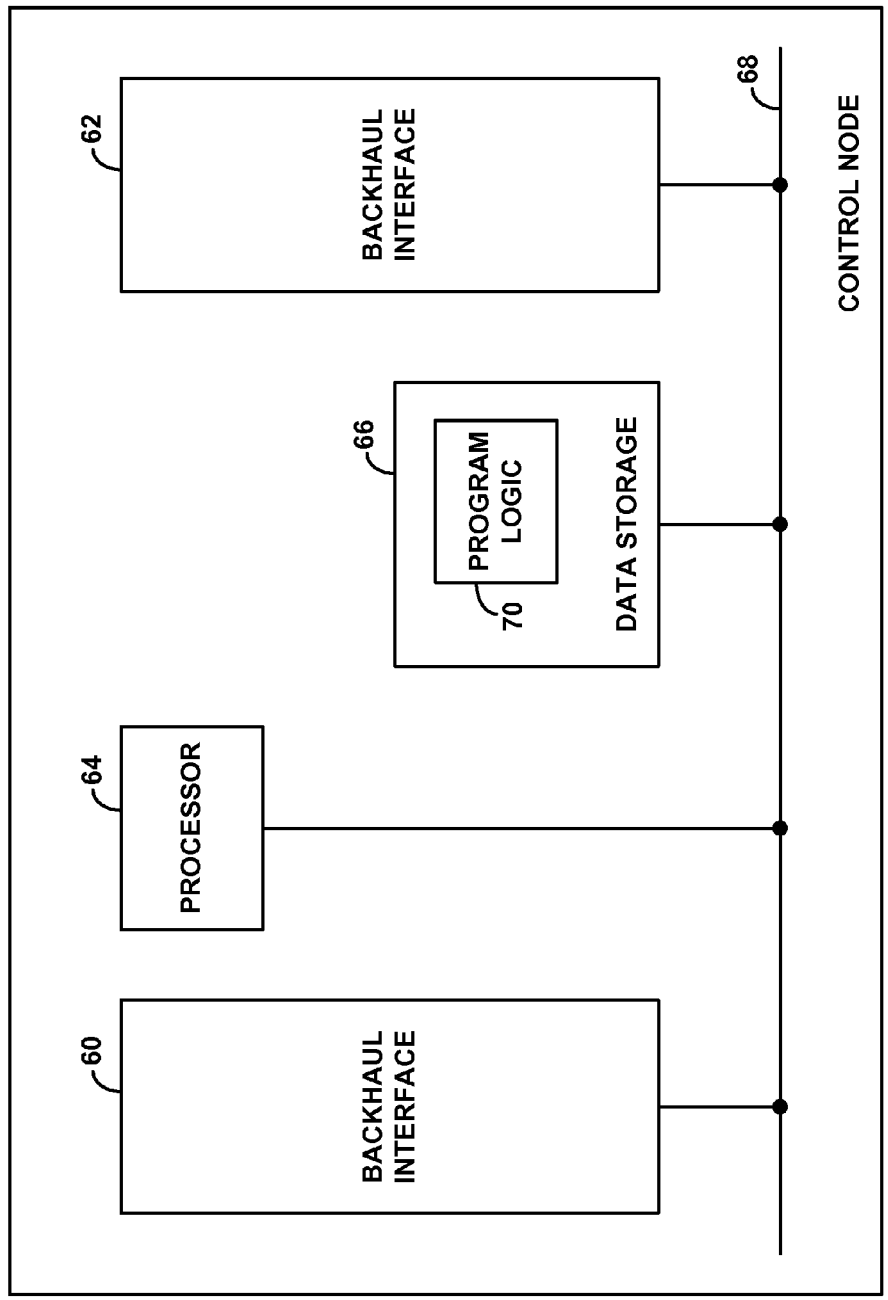
FIG. 3 is a block diagram of an example control node operable within the system of FIG. 1.

FIG. 3 is a block diagram of the control node 16, showing some of the functional components that the control node may include in the arrangement of FIG. 1. As shown, the control node may include a first backhaul interface 60, a second backhaul interface 62, a processor 64, and non-transitory data storage 66, all of which may be communicatively linked together by a system bus, network, or other connection mechanism 68.

The first backhaul interface 60 functions to provide direct or indirect connectivity with the various base stations and particularly with the backhaul interface 46 of each base station, so as to facilitate communication of control signaling between the control node and each base station. As with the base station backhaul interface 46, the first backhaul interface 60 of the control node may be arranged for wired and/or wireless backhaul communication and may take various forms depending on the links that connect the control node with each base station. For example, the first backhaul interface 60 may connect an MME with one or more S1 links to a plurality of eNodeBs.

The second backhaul interface 62 functions to provide connectivity with other RAN elements and/or with the transport network 14. For instance, if the control node is an MME, the second backhaul interface 62 may connect with a link to an S-GW or P-GW that in turn provide connectivity with the transport network. In another example, if the control node is a BSC, the second backhaul interface 62 may connect with a link to an MSC or PDSN that in turn provides connectivity with the transport network. Alternatively, if the control node is an MSC, the second backhaul interface 62 may simply provide connectivity with the PSTN. Other examples are possible as well.

As with the base station processor 50, the control node processor 64 may include one or more general purposes processors and/or one or more special purpose processors. The data storage 66, in turn, may include one or more volatile and/or non-volatile storage components, such as magnetic, optical, or organic storage components, which can be integrated in whole or in part with the processor 64. As shown, the data storage 66 may contain program logic 70, which can be executed by the processor 64 to carry out various control node functions described herein.

For instance, the program logic 70 may be executable to detect a trigger for paging the mobile station 32 and to responsively generate and send to one or more of the base stations 18, 20, 22 (defining a relevant paging zone for example) a paging directive, instructing the base stations to initiate paging of the mobile station. Further, the logic may be executable to receive from one of the base stations a notification that the base station received a page response from the mobile station, and to responsively establish a communication path with the mobile station.

Figure 4:
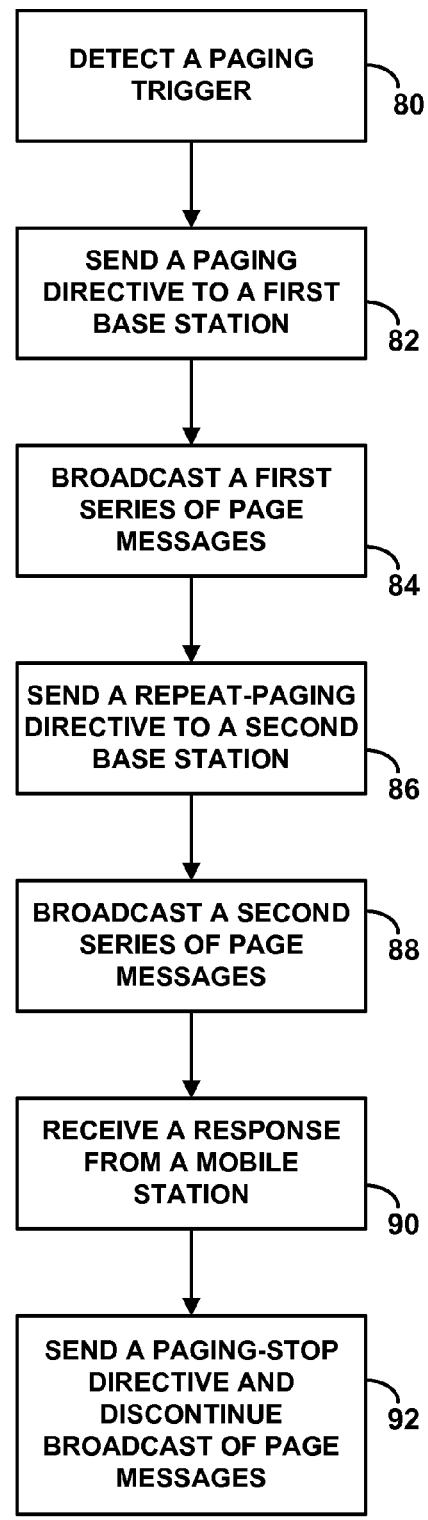
FIG. 4 is a flow chart depicting functions that can be carried out in accordance with an embodiment of the present disclosure.

FIG. 4 is a flow chart depicting functions that can be carried out in accordance with the present disclosure to control repeat-paging of mobile stations within the RAN. As shown in FIG. 4 and with further reference to FIGS. 1-3, at block 80, a control node detects a paging trigger for paging a mobile station. Detecting the paging trigger can take various forms. For instance if the control node is an MME, detecting the paging trigger may involve receiving the paging trigger sent from an S-GW when data arrives at the S-GW for the mobile station or otherwise determining that communication with the mobile station is needed. Or if the RAN controller is an MSC, detecting the paging trigger may involve receiving a call setup signaling message indicating that a call is to be set up to the mobile station. Still alternatively, the function of detecting the paging trigger could involve simply determining that a next attempt at paging is required, such as after a first failed paging attempt or the like. Other examples are possible as well.

Responsive to detecting the paging trigger, at block 82, the control node sends a paging directive to a first base station (or a first plurality of base stations). In one example, the control node is an MME and the first base station is an eNodeB, at block 82, the MME sends the eNodeB the paging directive (or Paging Request message) through a link between the MME and the eNodeB, such as an S1 link. Such a directive may include data that informs the first base station how many times the base station should page the mobile station and how much time the base station should wait between successive pages. Alternatively, each base station could have default settings (e.g., number of attempts and time interval between attempts) for such a paging directive, in which case the paging directive could include instructions to direct the base station to initiate the process with those settings.

In response to receiving the paging directive, at block 84, the first base station begins broadcasting a first series of page messages (e.g., page attempts) destined to the mobile station. When the first base station sends the page messages to the mobile station, the base station may optimally do so in timeslots that the mobile station is set to scan. For instance, if the mobile station is set to operate at a slot cycle of 1.28 seconds, then the base station may wait an interval of 1.28 seconds between successive page message transmissions to the mobile station, or the base station may wait an interval that is a multiple of 1.28 seconds (e.g., 2.56 seconds, 5.12 seconds, or 10.24 seconds) between successive page message transmissions to the mobile station. If the first base station receives a response from the mobile station to the page messages, the first base station can then discontinue broadcasting the pages messages. The control node can also receive the response, either directly from the mobile station or through the first base station, and, in response to receiving the response, the control node can establish a communication path between the mobile station and the transport network.

However, in the present example, if the first base station does not receive a response from the base station to the first series of page messages within a defined period, at block 86, the first base station forms a repeat-paging directive and sends the repeat-paging directive to a second base station (or a second plurality of base stations). The defined period can be defined by a length of time or a number of page messages sent from the first base station, which can be, in turn, defined by a length of time. Further, in one example, the first base station sends the repeat-paging directive directly to the second base station without the repeat-paging directive being routed through the control node. Illustratively, the first and second base stations can be eNodeBs and, at block 86, the first eNodeB sends the repeat-paging directive to the second eNodeB over an X2 link that communicatively couples and extends between the first and second eNodeBs.

Further, in the present example at block 86, the first base station may select the second base station from a neighbor list that includes information relating to one or more other base stations that are arranged to radiate to define one or more wireless coverage areas neighboring a coverage area defined by the first base station. This neighbor list includes information that identifies neighboring base stations and connectivity information for establishing communications with the neighboring base stations. Generally, the neighbor list for a particular base station, in this example the first base station, includes information for other base stations that define coverage areas that are immediately neighboring or adjacent to the coverage area of the first base station. Although, the neighbor list for the first base station may also include information for other base stations associated with wireless coverage areas that are nearby but not necessarily adjacent to the coverage area of the first base station. In this example, at block 86, the first base station selects the second base station (or plurality of second base stations) from the neighbor list and sends the repeat-paging directive to the second base station.

In another aspect of the flow chart of FIG. 4, the first base station may perform a procedure (e.g., regularly or periodically in the background) to define or update the neighbor list discussed above. For example, under the LTE protocol, each eNodeB can perform an automatic neighbor relation (ANR) function to detect and add new neighbors to the neighbor list and to remove outdated neighbors from the neighbor list. This process of dynamically updating neighbor lists and selecting the second base station to receive repeat-paging directives facilitates the intelligent and more effective expansion of paging areas as compared to using static paging lists.

In response to receiving the repeat-paging directive from the first base station, at block 88, the second base station begins wirelessly broadcasting a second series of page messages destined to the mobile station.

At this point, the first base station and the second base station may continue to broadcast page messages until a response is received from the mobile station. In FIG. 4, at block 90, the first base station or the second base station may then receive a response from the mobile station to a page message. Responsive to receiving the response from the mobile station, at block 92, the base station that received the response discontinues broadcasting page messages and sends a paging-stop directive to the other base station. In response to receiving the paging-stop directive, the other base station may then likewise discontinue broadcasting the page messages. In one example, the first and second base stations are eNodeBs and the paging-stop directive can be sent between the eNodeBs over an X2 link that extends between the base stations. In the present example, after the first base station sends the repeat-paging directive to the second base station, the first base station may receive a response from the mobile station. In response to receive the mobile station response, the first base station may then discontinue broadcasting page messages and send the paging-stop directive to the second base station.

An illustrative embodiment has been described above. It should be understood, however, that variations from the embodiment discussed are possible, while remaining within the true spirit and scope of the invention as claimed.

We claim:

1. A method for paging a mobile station in a cellular radio access network, the method comprising:
    wirelessly broadcasting from a first base station a first series of page messages destined to the mobile station, wherein broadcasting the first series of page messages is performed in response to the first base station receiving a paging directive from a control node; and
    responsive to the first base station receiving no response from the mobile station within a defined period after broadcasting the first series of page messages, sending a repeat-paging directive from the first base station to a second base station, wherein the repeat-paging directive directs the second base station to wirelessly broadcast a second series of page messages destined to the mobile station.

2. The method of claim 1, further comprising
    detecting at the control node a paging trigger for paging a mobile station;
    responsive to the control node detecting the paging trigger, sending the paging directive from the control node to the first base station; and
    responsive to the second base station receiving the repeat-paging directive, wirelessly broadcasting from the second base station the second series of page messages destined to the mobile station.

3. The method of claim 1, wherein sending the repeat-paging directive to the second base station further includes sending the repeat-paging directive from the first base station directly to the second base station without routing the repeat-paging directive through the control node.

4. The method of claim 3, wherein sending the repeat-paging directive to the second base station further includes sending the repeat-paging directive from the first base station directly to the second base station over one or more X2 links extending from the first base station to the second base station.

5. The method of claim 1, wherein each base station is arranged to radiate to define at least one respective wireless coverage area for serving mobile stations, and wherein the method further comprises the first base station dynamically updating a neighbor list that includes information relating to one or more other base stations that are arranged to radiate to define one or more wireless coverage areas neighboring a coverage area defined by the first base station, and further comprising the first base station selecting the second base station, to which the first base station sends the repeat paging directive, from the neighbor list.

6. The paging method of claim 1, further comprising the first base station discontinuing broadcasting of the first series of page messages in response to the first base station receiving at least one of a response from the mobile station to one of the page messages or a paging stop directive from the second base station, and further comprising the second base station discontinuing broadcasting of the second series of page messages in response to the second base station receiving at least one of a response from the mobile station to one of the page messages or a paging stop directive from the first base station.

7. The paging method of claim 6, further comprising at least one of the first base station sending a paging-stop directive from the first base station to the second base station in response to the first base station receiving a response from the mobile station to one of the page messages or the second base station sending a paging-stop directive from the second base station to the first base station in response to the second base station receiving a response from the mobile station to one of the page messages.

8. A paging system comprising:
    a control node; and
    a first base station and a second base station, each base station being configured to radiate to define at least one respective wireless coverage area for serving mobile stations,
    wherein the control node, the first base station, and the second base station are communicatively linked with each other,
    wherein the control node is configured to detect a paging trigger for paging a mobile station and, in response to detecting the paging trigger, to send a paging directive to the first base station cause the first base station to page the mobile station,
    wherein the first base station is arranged to begin broadcasting, in response to receiving the paging directive, a first series of page messages destined to the mobile station, and
    wherein the first base station is arranged to send, in response to receiving no response from the mobile station within a defined period after broadcasting the first series of page messages, a repeat-paging directive to the second base station, and wherein the repeat-paging directive causes the second base station to begin broadcasting a second series of page messages destined to the mobile station.

9. The paging system of claim 8, wherein the first base station is arranged to send the repeat-paging directive directly to the second base station without routing the repeat-paging directive through the control node.

10. The paging system of claim 9, wherein the first base station is arranged to send the repeat-paging directive directly to the second base station over one or more X2 links that extend between the first base station and the second base station.

11. The paging system of claim 8, wherein the control node is a mobility management entity, each of the first base station and the second base station are eNodeBs, and the paging system is configured to operate under a Long Term Evolution air interface protocol.

12. The paging system of claim 8, wherein the first base station is arranged to dynamically update a neighbor list that includes information relating to one or more other base stations that are arranged to radiate to define one or more wireless coverage areas neighboring a coverage area defined by the first base station, and wherein the first base station is arranged to select the second base station, to which the first base station sends the repeat-paging directive, from the neighbor list.

13. The paging system of claim 8, wherein the first base station is arranged to discontinue broadcasting the first series of page messages in response to the first base station receiving at least one of a response from the mobile station to one of the page messages or a paging-stop directive from the second base station, and wherein the second base station is arranged to discontinue broadcasting the second series of page messages in response to the second base station receiving at least one of a response from the mobile station to one of the page messages or a paging-stop directive from the first base station.

14. The paging system of claim 8, wherein the first base station is arranged, in response to the first base station receiving a response from the mobile station to one of the page messages, to send a paging-stop directive to the second base station if the second base station is broadcasting the second series of page messages, and wherein the second base station is arranged, in response to the second base station receiving a response from the mobile station to one of the page messages, to send a paging-stop directive to the first base station if the first base station is broadcasting the first series of page messages.

15. A base station comprising:
a communication interface through which the base station (first base station) communicates with a second base station and a control node, wherein each base station is configured to radiate to define at least one respective wireless coverage area for serving mobile stations;
a processor;
data storage;
first paging logic stored in the data storage and executable by the processor to broadcast a first series of page messages destined to the mobile station in response to receiving a paging trigger sent from the control node; and
second paging logic stored in the data storage and executable by the processor to send a repeat-paging directive to the second base station in response to receiving no response from the mobile station within a defined period after broadcasting the first series of page messages, wherein the repeat-paging directive directs the second base station to begin broadcasting a second series of page messages destined to the mobile station.

16. The base station of claim 15, wherein the second paging logic is executable to send the repeat-paging directive directly to the second base station without routing the repeat-paging directive through the control node.

17. The base station of claim 16, wherein the communication interface includes an X2 link interface for communication with the second base station and an S1 link interface for communication with the control node, wherein the second paging logic is executable by the processor to send the repeat-paging directive through the X2 link interface.

18. The base station of claim 15, further comprising neighbor list updating logic stored in the data storage and executable by the processor to dynamically update a neighbor list that includes information relating to one or more base stations that are arranged to radiate to define one or more wireless coverage areas neighboring a coverage area defined by the first base station, wherein the neighbor list is stored in the data storage, and wherein the second paging logic is executable by the processor to select the second base station, to which the first base station sends the repeat-paging directive, from the neighbor list.

19. The base station of claim 18, wherein the first paging logic is executable by the processor to broadcast the first series of page messages until the first base station receives at least one of a response from the mobile station to one of the page messages or a paging-stop directive from the second base station.

20. The base station of claim 19, further comprising paging-stop logic stored in the data storage and executable by the processor, in response to the first base station receiving a response from the mobile station to the one of the page messages, to send a paging-stop directive to the second base station if the second base station is broadcasting the second series of page messages, wherein the paging-stop directive directs the second base station to discontinue broadcasting the second series of page messages.

* * * * *